US007221369B1

(12) United States Patent
Tripathi et al.

(10) Patent No.: US 7,221,369 B1
(45) Date of Patent: May 22, 2007

(54) APPARATUS, SYSTEM, AND METHOD FOR DELIVERING DATA TO MULTIPLE MEMORY CLIENTS VIA A UNITARY BUFFER

(75) Inventors: Brijesh Tripathi, Santa Clara, CA (US); Wayne Douglas Young, Milpitas, CA (US); Adam E. Levinthal, Redwood City, CA (US); Stephen M. Ryan, Cupertino, CA (US)

(73) Assignee: Nvidia Corporation, Santa Clara, CA (US)

( * ) Notice: Subject to any disclaimer, the term of this patent is extended or adjusted under 35 U.S.C. 154(b) by 243 days.

(21) Appl. No.: 10/903,403

(22) Filed: Jul. 29, 2004

(51) Int. Cl.
*G06F 15/00* (2006.01)
*G06F 13/00* (2006.01)
*G09G 5/36* (2006.01)
*G06T 1/20* (2006.01)
*G06T 1/00* (2006.01)
*G06T 15/00* (2006.01)
*G06F 15/167* (2006.01)
*G06F 13/28* (2006.01)

(52) U.S. Cl. ............ 345/532; 345/501; 345/522; 345/537; 345/541; 709/213; 709/216; 711/147

(58) Field of Classification Search ........ 345/501, 345/506, 522, 536, 537, 545, 558, 541, 532, 345/530; 711/119, 125, 130, 153, 147–150, 711/155, 171, 173; 709/201–203, 212–219
See application file for complete search history.

(56) References Cited

U.S. PATENT DOCUMENTS

| 5,546,455 A * | 8/1996 | Joyce et al. ........... 379/265.03 |
| 5,893,140 A * | 4/1999 | Vahalia et al. .............. 711/118 |
| 6,006,303 A | 12/1999 | Barnaby et al. |
| 6,026,474 A * | 2/2000 | Carter et al. ............... 711/202 |
| 6,104,417 A | 8/2000 | Neilsen et al. |
| 6,438,629 B1 * | 8/2002 | Huebner et al. ............. 710/52 |
| 6,760,820 B2 * | 7/2004 | Henson et al. ............. 711/151 |
| 6,882,620 B1 * | 4/2005 | MacLellan et al. ......... 370/217 |
| 2002/0199060 A1 * | 12/2002 | Peters et al. ............... 711/114 |
| 2004/0064521 A1 * | 4/2004 | Baudry et al. .............. 709/213 |
| 2005/0086386 A1 * | 4/2005 | Shen et al. ................ 709/249 |

* cited by examiner

*Primary Examiner*—Wesner Sajous
(74) *Attorney, Agent, or Firm*—Cooley Godward Kronish LLP

(57) ABSTRACT

Apparatus, system, and method for delivering data to multiple memory clients are described. In one embodiment, a graphics processing apparatus includes an output pipeline including a set of memory clients. The graphics processing apparatus also includes a memory controller connected to the output pipeline. The memory controller is configured to retrieve data requested by respective ones of the set of memory clients from a memory. The graphics processing apparatus further includes a buffering module connected between the memory controller and the output pipeline. The buffering module includes a unitary buffer and a buffer controller connected to the unitary buffer. The buffer controller is configured to coordinate storage of the data in the unitary buffer, and the buffer controller is configured to coordinate delivery of the data from the unitary buffer to respective ones of the set of memory clients.

2 Claims, 12 Drawing Sheets

ND METHOD FOR
APPARATUS, SYSTEM, AND METHOD FOR DELIVERING DATA TO MULTIPLE MEMORY CLIENTS VIA A UNITARY BUFFER

BRIEF DESCRIPTION OF THE INVENTION

The invention relates generally to servicing multiple memory clients. More particularly, the invention relates to an apparatus, system, and method for delivering data to multiple memory clients via a unitary buffer.

BACKGROUND OF THE INVENTION

In current graphics systems, the number and processing speed of memory clients have increased enough to make memory access latency a barrier to achieving high performance. FIG. 1 illustrates a Graphics Processing Unit ("GPU") 100 of the prior art. The GPU 100 includes a graphics pipeline 102, which includes a set of memory clients 104, 106, 108, and 110. The graphics pipeline 102 is connected to a memory controller 112, which serves as an interface between the set of memory clients 104, 106, 108, and 110 and a memory (not illustrated). When a particular memory client makes a request for data, the memory controller 112 retrieves the data from the memory for that memory client. When multiple memory clients make requests for data substantially simultaneously, the memory controller 112 can determine which of the multiple memory clients is allowed access to the memory at a particular time. Typically, at least one of the set of memory clients 104, 106, 108, and 110 corresponds to an isochronous memory client, which is one that expects data to be delivered in a periodic manner or in accordance with a baseline rate. As can be appreciated, untimely delivery of data to such an isochronous memory client can lead to a stall and degradation of a visual output.

As illustrated in FIG. 1, the GPU 100 also includes an array of dedicated buffers 114, 116, 118, and 120, which are connected between the memory controller 112 and the graphics pipeline 102. The array of dedicated buffers 114, 116, 118, and 120 are configured to store data retrieved by the memory controller 112 and to deliver the data to the set of memory clients 104, 106, 108, and 110. The array of dedicated buffers 114, 116, 118, and 120 can serve to reduce memory access latency by storing an advance supply of data to be processed by the set of memory clients 104, 106, 108, and 110. Each dedicated buffer has a fixed buffering space that is dedicated to store data for a particular memory client. Thus, for example, the dedicated buffer 114 is dedicated to store data for the memory client 104, while the dedicated buffer 116 is dedicated to store data for the memory client 106. As illustrated in FIG. 1, the GPU 100 also includes an array of dedicated Read/Write controllers ("R/W controllers") 122, 124, 126, and 128, which are connected to respective ones of the array of dedicated buffers 114, 116, 118, and 120.

A significant drawback of the buffering implementation illustrated in FIG. 1 is that use of the array of dedicated buffers 114, 116, 118, and 120 and the array of dedicated R/W controllers 122, 124, 126, and 128 can lead to inefficiencies when a subset of the memory clients 104, 106, 108, and 110 is inactive or do not require all of its dedicated buffering space. For example, whenever a particular memory client is inactive or is operating with reduced memory access requirements, its dedicated buffering space is unused or underused. Such unused or underused buffering space translates into wasted buffering space that otherwise could have been assigned to another memory client that is active or is operating with enhanced memory access requirements. Also, such unused or underused buffering space translates into inefficient use of valuable die area on a chip.

It is against this background that a need arose to develop the apparatus, system, and method described herein.

SUMMARY OF THE INVENTION

In one aspect, the invention relates to a graphics processing apparatus. In one embodiment, the graphics processing apparatus includes an output pipeline including a set of memory clients. The graphics processing apparatus also includes a memory controller connected to the output pipeline. The memory controller is configured to retrieve data requested by respective ones of the set of memory clients from a memory. The graphics processing apparatus further includes a buffering module connected between the memory controller and the output pipeline. The buffering module includes a unitary buffer and a buffer controller connected to the unitary buffer. The buffer controller is configured to coordinate storage of the data in the unitary buffer, and the buffer controller is configured to coordinate delivery of the data from the unitary buffer to respective ones of the set of memory clients.

In another aspect, the invention relates to a buffering module. In one embodiment, the buffering module includes a unitary buffer configured to store data items for a set of memory clients. The buffering module also includes a buffer controller connected to the unitary buffer. The buffer controller is configured to associate each of the data items with a respective one of the set of memory clients, and the buffer controller is configured to coordinate delivery of the data items from the unitary buffer to respective ones of the set of memory clients.

In a further aspect, the invention relates to a method of delivering data to a set of memory clients via a unitary buffer. In one embodiment, the method includes assigning a first portion of the unitary buffer to store data requested by a first memory client of the set of memory clients. The method also includes assigning a second portion of the unitary buffer to store data requested by a second memory client of the set of memory clients. The method further includes delivering the data requested by the first memory client from the first portion of the unitary buffer to the first memory client in accordance with a First-In First-Out ("FIFO") scheme and delivering the data requested by the second memory client from the second portion of the unitary buffer to the second memory client in accordance with a FIFO scheme.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings, in which:

FIG. 10 illustrates a buffering module in accordance with a further embodiment of the invention.

DETAILED DESCRIPTION

Figure 1:
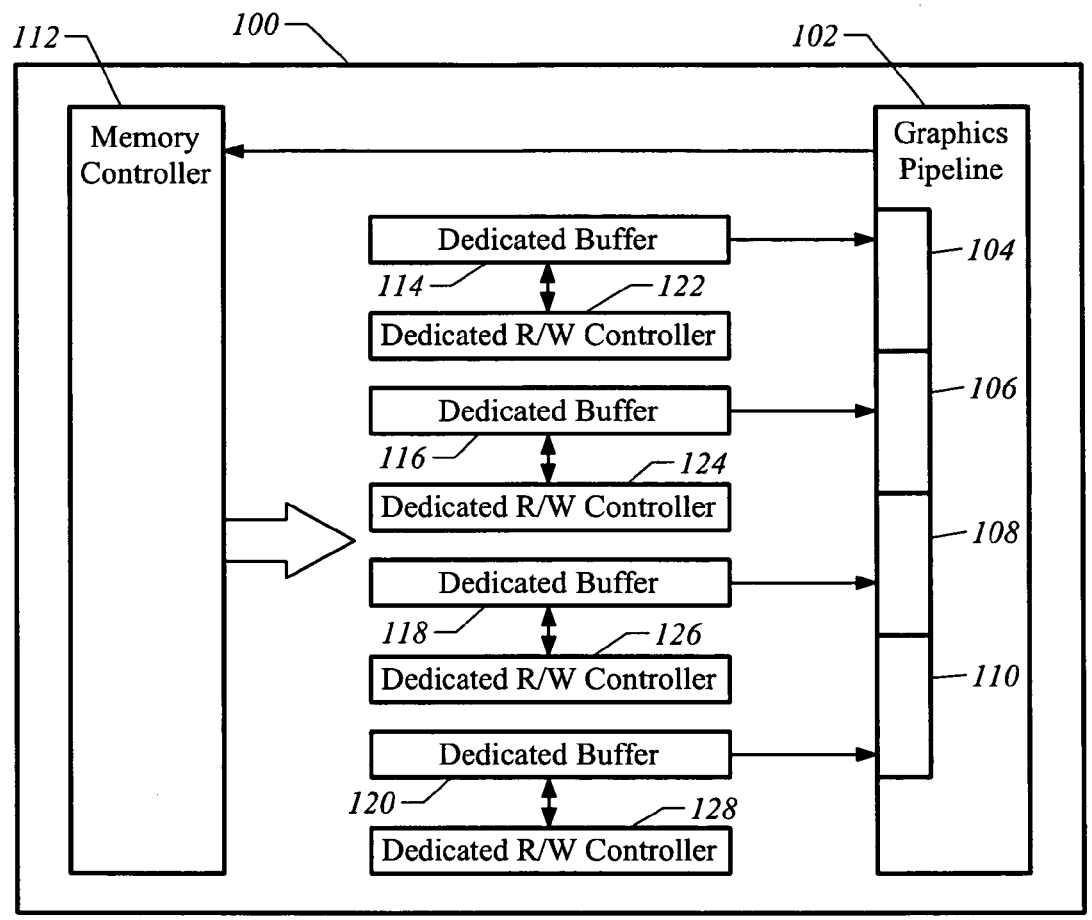
FIG. 1 illustrates a GPU of the prior art.
Figure 2:
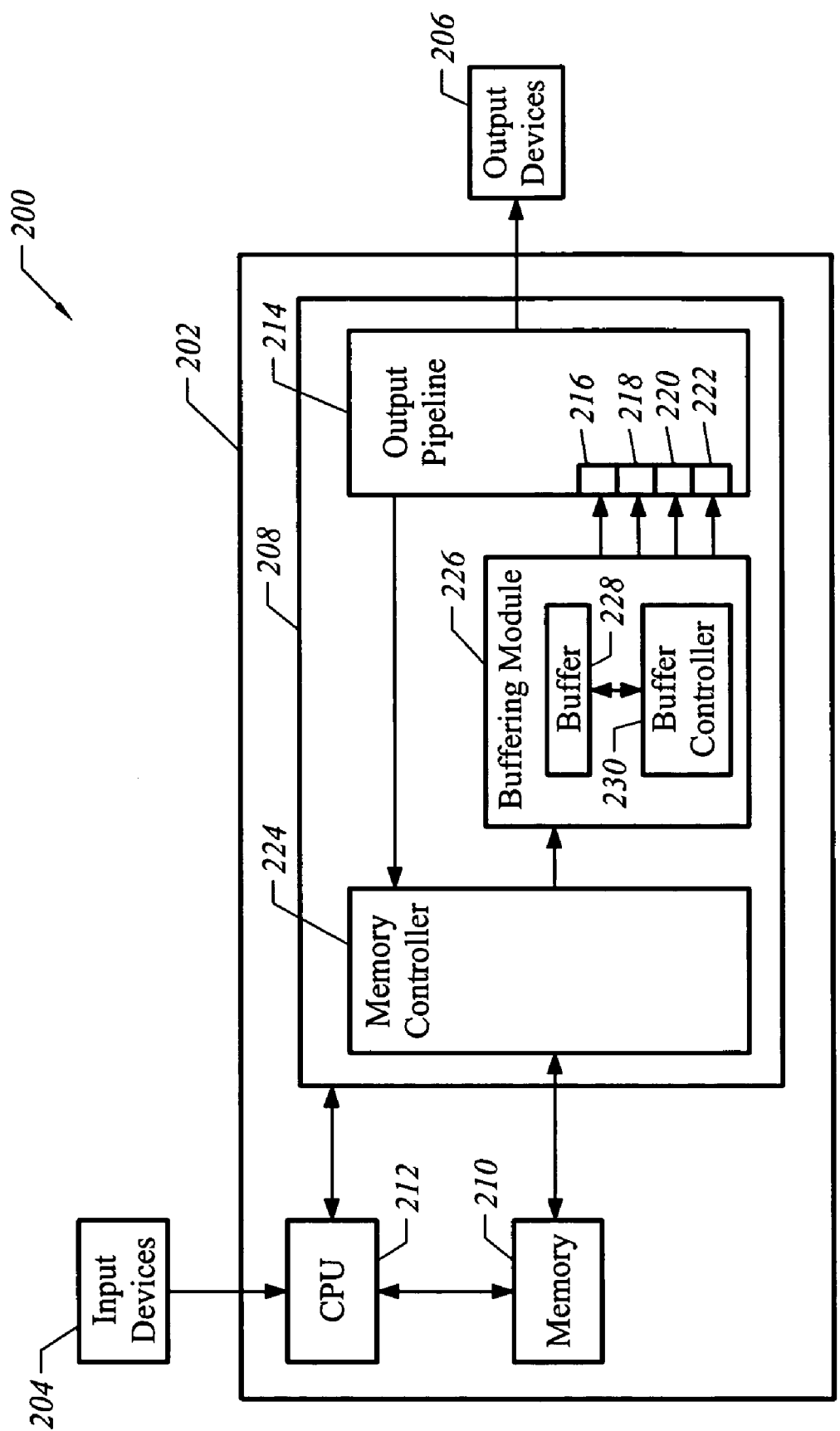
FIG. 2 illustrates a computer system that can be operated in accordance with an embodiment of the invention.

FIG. 2 illustrates a computer system 200 that can be operated in accordance with an embodiment of the invention. The computer system 200 includes a computer 202, which can be, for example, a personal computer or a workstation. As illustrated in FIG. 2, the computer 202 is connected to a set (i.e., one or more) of input devices 204, which can include, for example, a keyboard and a mouse. The computer 202 is also connected to a set of output devices 206, which can include, for example, a speaker, a television set, a Cathode Ray Tube monitor, and a Liquid Crystal Display monitor.

The computer 202 includes a Central Processing Unit ("CPU") 212, which is connected to a memory 210. The memory 210 can include, for example, a Random Access Memory ("RAM") and a Read Only Memory ("ROM"). As illustrated in FIG. 2, the computer 202 also includes a graphics processing apparatus 208 that is connected to the CPU 212 and the memory 210. The graphics processing apparatus 208 can be, for example, a GPU. The graphics processing apparatus 208 is configured to perform a number of processing operations to generate visual outputs using the set of output devices 206. Alternatively, or in conjunction, the graphics processing apparatus 208 is configured to perform a number of processing operations to generate audio outputs using the set of output devices 206.

In the illustrated embodiment, the graphics processing apparatus 208 includes an output pipeline 214, which includes a set of memory clients 216, 218, 220, and 222. While four memory clients are illustrated in FIG. 2, it is contemplated that more or less memory clients can be included depending on the particular implementation. At least one memory client of the set of memory clients 216, 218, 220, and 222 can correspond to a graphics processing element that is configured to process data to generate a visual output. For example, two or more of the set of memory clients 216, 218, 220, and 222 can correspond to graphics processing elements that are configured to generate respective display elements that can layered or otherwise combined to form a visual output. A graphics processing element can include, for example, a data processing element, a mixing element, or both. Examples of display elements include display surfaces representing a base, a cursor, and an overlay. Alternatively, or in conjunction, at least one memory client of the set of memory clients 216, 218, 220, and 222 can correspond to an audio processing element that is configured to process data to generate an audio output. Different memory clients of the set of memory clients 216, 218, 220, and 222 can be configured to generate outputs using the same output device or using different output devices included in the set of output devices 206. Typically, at least one memory client of the set of memory clients 216, 218, 220, and 222 corresponds to an isochronous memory client.

In the illustrated embodiment, the graphics processing apparatus 208 also includes a memory controller 224, which is connected to the output pipeline 214. The memory controller 224 serves as an interface between the set of memory clients 216, 218, 220, and 222 and the memory 210. The memory controller 224 is configured to retrieve data requested by respective ones of the set of memory clients 216, 218, 220, and 222 from the memory 210. When multiple memory clients make requests for data substantially simultaneously, the memory controller 224 can determine which of the multiple memory clients is allowed access to the memory 210 at a particular time.

As illustrated in FIG. 2, the graphics processing apparatus 208 further includes a buffering module 226, which is connected between the memory controller 224 and the output pipeline 214. The buffering module 226 is configured to store data retrieved by the memory controller 224 and to deliver the data to the set of memory clients 216, 218, 220, and 222. The buffering module 226 can serve to reduce memory access latency by storing an advance supply of data to be processed by the set of memory clients 216, 218, 220, and 222. In the illustrated embodiment, the buffering module 226 includes a unitary buffer 228, which has a buffering space that is shared by the set of memory clients 216, 218, 220, and 222. The buffering module 226 also includes a buffer controller 230, which is connected to the unitary buffer 228. The buffer controller 230 is configured to coordinate storage of data in the unitary buffer 228 and to coordinate delivery of the data from the unitary buffer 228 to respective ones of the set of memory clients 216, 218, 220, and 222.

Advantageously, the buffer controller 230 can dynamically assign portions of the shared buffering space based on memory access requirements of the set of memory clients 216, 218, 220, and 222. For example, when a particular memory client is active or is operating with enhanced memory access requirements, the buffer controller 230 can assign a greater portion of the shared buffering space to that memory client. On the other hand, when a particular memory client is operating with reduced memory access requirements, the buffer controller 230 can assign a smaller portion of the shared buffering space to that memory client. If that memory client is currently inactive, the buffer controller 230 need not assign a portion of the shared buffering space to that memory client. Accordingly, the buffering module 226 allows a more efficient use of the shared buffering space as compared with a buffering implementation having dedicated buffering spaces. This more efficient use of the shared buffering space can translate into a smaller overall buffering space requirement for the set of memory clients 216, 218, 220, and 222 and a more efficient use of valuable die area. Also, unlike a buffering implementation having dedicated buffering spaces, the buffering module 226 can be readily configured to service additional memory clients without requiring additional buffering space to be included.

Figure 3:
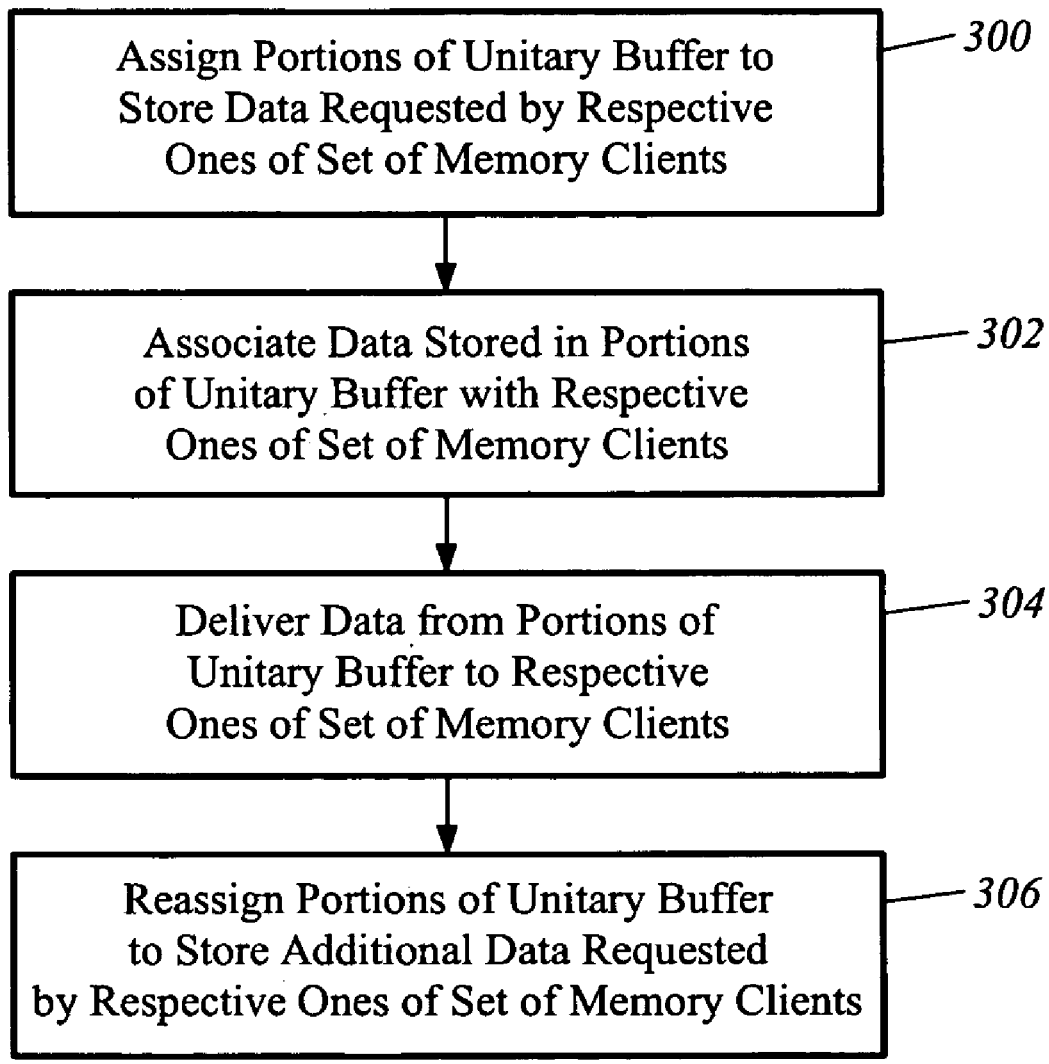
FIG. 3 illustrates a flow chart for delivering data to a set of memory clients in accordance with an embodiment of the invention.

Attention next turns to FIG. 3, which illustrates a flow chart for delivering data to a set of memory clients (e.g., the set of memory clients 216, 218, 220, and 222) in accordance with an embodiment of the invention.

The first operation illustrated in FIG. 3 is to assign portions of a unitary buffer (e.g., the unitary buffer 228) to store data requested by respective ones of the set of memory clients (block 300). In the illustrated embodiment, the unitary buffer has a buffering space that is shared by the set of memory clients, and a buffer controller (e.g., the buffer controller 230) is configured to dynamically assign portions of the shared buffering space based on memory access requirements of the set of memory clients. For example, the buffer controller can assign a first portion of the shared buffering space to store data requested by a first memory client of the set of memory clients, and the unitary buffer can store that data in the first portion of the shared buffering space. Also, the buffer controller can assign a second portion of the shared buffering space to store data requested by a second memory client of the set of memory clients, and the unitary buffer can store that data in the second portion of the shared buffering space. On the other hand, if a third memory client of the set of memory clients is currently inactive and is not requesting data, the buffer controller need not assign a portion of the shared buffering space to the third memory client.

The second operation illustrated in FIG. 3 is to associate the data stored in the portions of the unitary buffer with respective ones of the set of memory clients (block 302). In the illustrated embodiment, the buffer controller is configured to track which memory clients are associated with the data stored in the portions of the shared buffering space. With reference to the previous example, the buffer controller can associate the data stored in the first portion of the shared buffering space with the first memory client. Similarly, the buffer controller can associate the data stored in the second portion of the shared buffering space with the second memory client.

The third operation illustrated in FIG. 3 is to deliver the data from the portions of the unitary buffer to respective ones of the set of memory clients (block 304). In the illustrated embodiment, the buffer controller is configured to coordinate retrieval of the data stored in the portions of the shared buffering space and delivery of the data to respective ones of the set of memory clients. With reference to the previous examples, by associating the data stored in the first portion of the shared buffering space with the first memory client, the buffer controller can coordinate retrieval of that data from the unitary buffer, and the unitary buffer can deliver that data to the first memory client. Similarly, by associating the data stored in the second portion of the shared buffering space with the second memory client, the buffer controller can coordinate retrieval of that data from the unitary buffer, and the unitary buffer can deliver that data to the second memory client.

The fourth operation illustrated in FIG. 3 is to reassign the portions of the unitary buffer to store additional data requested by respective ones of the set of memory clients (block 306). In the illustrated embodiment, the buffer controller is configured to dynamically reassign the portions of the shared buffering space based on memory access requirements of the set of memory clients. In particular, subsequent to delivering data from a particular portion of the shared buffering space to a particular memory client, the buffer controller is configured to assign that portion of the shared buffering space to store additional data requested by that same memory client or a different memory client. With reference to the previous examples, subsequent to delivering the data stored in the first portion of the shared buffering space to the first memory client, the buffer controller can assign the first portion of the shared buffering space to store additional data requested by the first memory client or the second memory client.

Figure 4:
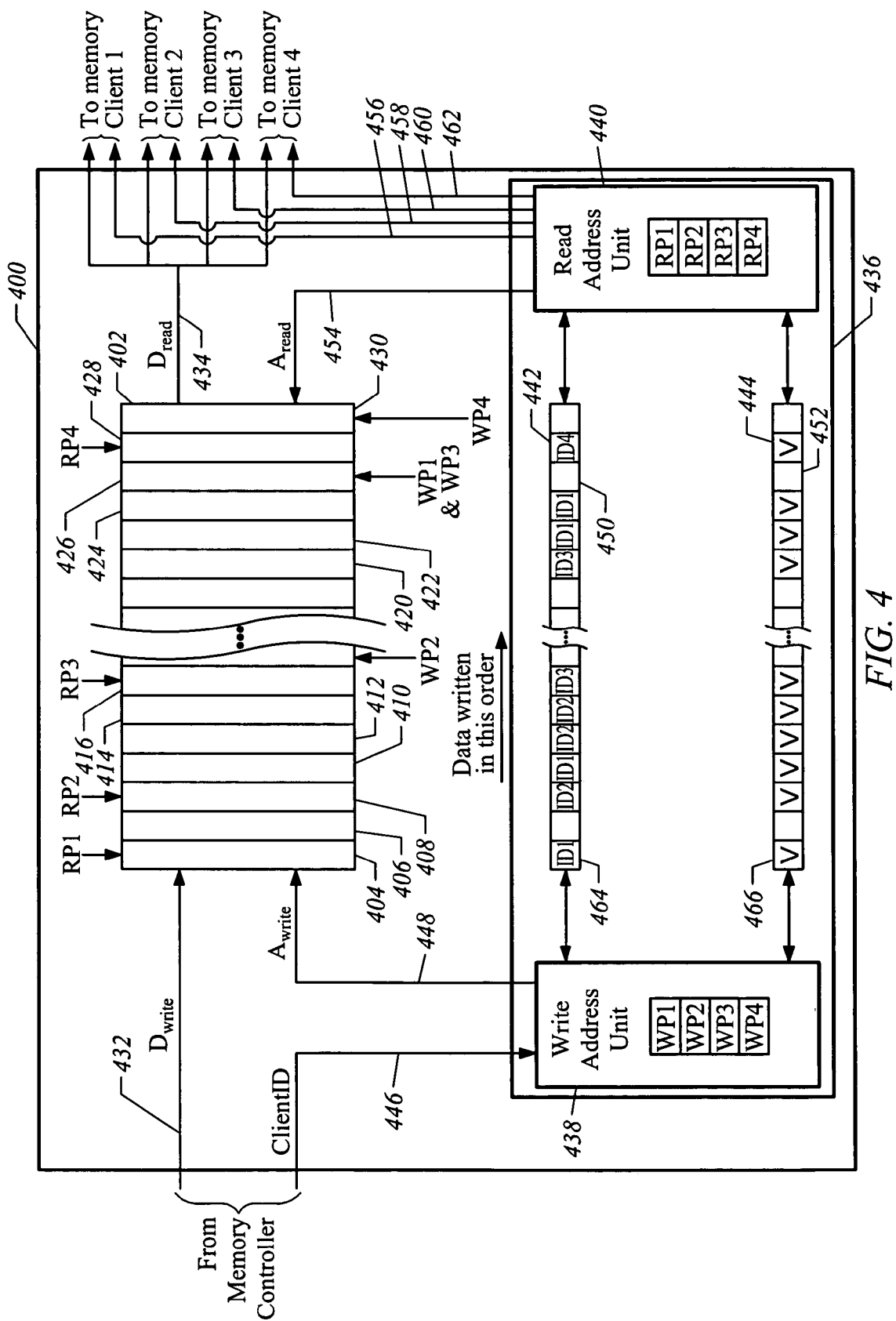
FIG. 4 illustrates a buffering module in accordance with an embodiment of the invention.

The foregoing discussion provides a general overview of some embodiments of the invention. Attention next turns to FIG. 4, FIG. 5, and FIG. 6, which illustrate a buffering module 400 in accordance with an embodiment of the invention. As illustrated in FIG. 4, the buffering module 400 includes a unitary buffer 402 that is configured to store data items for a set of memory clients (i.e., memory client 1, memory client 2, memory client 3, and memory client 4). In the illustrated embodiment, the unitary buffer 402 is implemented as a FIFO buffer using a RAM that includes n memory locations. The n memory locations are shared by the set of memory clients and are dynamically assigned based on memory access requirements of the set of memory clients. As illustrated in FIG. 4, memory locations 404, 410, 422, and 424 currently store data items to be delivered to memory client 1, memory locations 408, 412, and 414 currently store data items to be delivered to memory client 2, memory locations 416 and 420 currently store data items to be delivered to memory client 3, and a memory location 428 currently stores a data item to be delivered to memory client 4. A memory controller delivers data items to the unitary buffer 402 via a $D_{write}$ bus 432, and the data items are written into the unitary buffer 402 along a particular direction (i.e., from left to right and subject to possible wrap around). Data items are read from the unitary buffer 402, and the unitary buffer 402 delivers the data items to the set of memory clients via a $D_{read}$ bus 434.

In the illustrated embodiment, the buffering module 400 also includes a buffer controller 436 that is connected to the unitary buffer 402. The buffer controller 436 is configured to coordinate the manner in which data items are written into and read from the unitary buffer 402. In the illustrated embodiment, the buffer controller 436 is configured to coordinate writing and reading of data items for each memory client in accordance with a FIFO scheme. As illustrated in FIG. 4, the buffer controller 436 includes a write address unit 438, a read address unit 440, and a pair of search registers 442 and 444 that are connected to the write address unit 438 and the read address unit 440.

The write address unit 438 maintains write pointers WP1, WP2, WP3, and WP4 for memory client 1, memory client 2, memory client 3, and memory client 4, respectively. Each write pointer indicates the current write memory location for a particular memory client. For example, the write pointer WP1 indicates that a memory location 426 is the current write memory location for memory client 1. As another example, the write pointer WP3 indicates that the memory location 426 is also the current write memory location for memory client 3. The read address unit 440 maintains read pointers RP1, RP2, RP3, and RP4 for memory client 1, memory client 2, memory client 3, and memory client 4, respectively. Each read pointer indicates the current read memory location for a particular memory client. For example, the read pointer RP1 indicates that the memory location 404 is the current read memory location for memory client 1. By maintaining the write pointers WP1, WP2, WP3, and WP4 and the read pointers RP1, RP2, RP3, and RP4, data items can be stored in the unitary buffer 402 and delivered to each memory client in a correct order.

The write address unit 438 and the read address unit 440 operate in conjunction with the pair of search registers 442 and 444, which store status information for the n memory locations included in the unitary buffer 402. The search register 442 includes n register slots that are each associated with a respective one of the n memory locations. Similarly, the search register 444 includes n register slots that are each associated with a respective one of the n memory locations. The search register 442 stores Client Identifiers ("Client IDs") to indicate current assignments of the n memory locations with respect to the set of memory clients. The Client IDs that are stored in the search register 442 allow data items stored in the unitary buffer 402 to be associated with respective ones of the set of memory clients. As illustrated in FIG. 4, Client IDs for memory client 1, memory client 2, memory client 3, and memory client 4 are represented as "ID1", "ID2", "ID3", and "ID4", respectively. The search register 444 stores valid tags to indicate current occupancies of the n memory locations. As illustrated in FIG. 4, a valid tag is represented as "V".

As illustrated in FIG. 4, when a data item requested by a particular memory client is to be written into the unitary buffer 402, the memory controller delivers a Client ID for that memory client to the write address unit 438 via a Client ID line 446. Based on this Client ID, the write address unit 438 selects a write pointer for that memory client and delivers the write pointer to the unitary buffer 402 via an $A_{write}$ line 448. The data item is then written into the unitary buffer 402 at a memory location corresponding to the write pointer. The write address unit 438 then updates the status information stored in the pair of search registers 442 and 444 to reflect the current assignment and occupancy of this memory location. The write address unit 438 also updates the write pointer for that memory client to the next available memory location for that memory client.

For example, when a data item requested by memory client 1 is to be written into the unitary buffer 402, the memory controller delivers the Client ID for memory client 1 to the write address unit 438. Based on this Client ID, the write address unit 438 selects the write pointer WP1 and delivers the write pointer WP1 to the unitary buffer 402. The data item is then written into the unitary buffer 402 at the memory location 426 corresponding to the write pointer WP1. Also, the write address unit 438 updates the status information stored in the pair of search registers 442 and 444 and updates the write pointer WP1.

Figure 5:
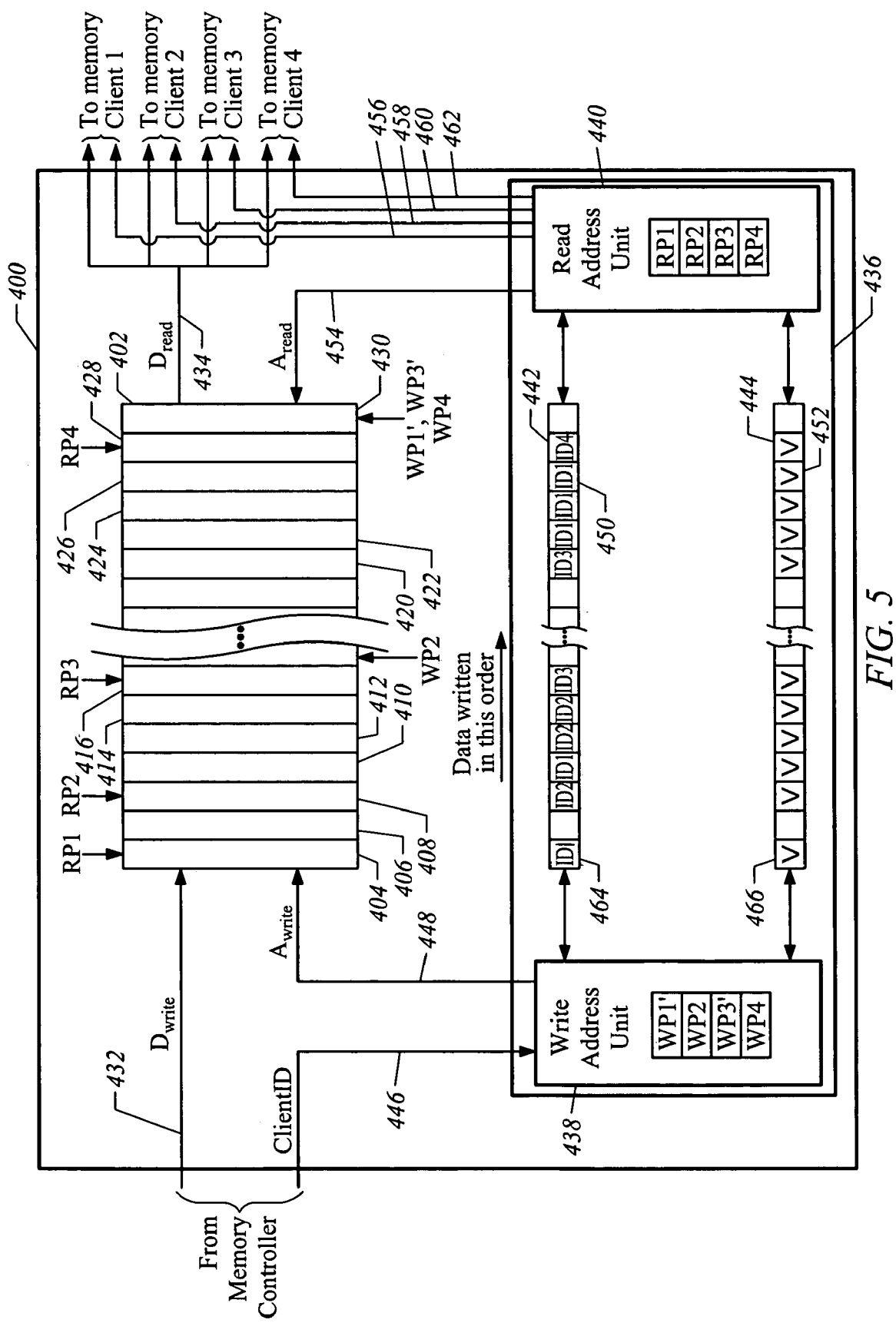
FIG. 5 illustrates the buffering module of FIG. 4 subsequent to a write operation.

FIG. 5 illustrates the buffering module 400 of FIG. 4 subsequent to writing the data item requested by memory client 1 into the unitary buffer 402. As illustrated in FIG. 5, the write address unit 438 updates the status information stored in the pair of search registers 442 and 444, such that a register slot 450 stores the Client ID for memory client 1, and a register slot 452 stores a valid tag. The write address unit 438 also updates the write pointer WP1 to the next memory location for memory client 1 that is associated with a cleared valid tag in the search register 444. In particular, the write pointer WP1 is updated to WP1', which indicates that a memory location 430 is now the current write memory location for memory client 1. In the illustrated embodiment, the write address unit 438 also updates the write pointer WP3 to the next available memory location for memory client 3. In particular, the write pointer WP3 is updated to WP3', which indicates that the memory location 430 is also the current write memory location for memory client 3.

As illustrated in FIG. 5, when a data item requested by a particular memory client is to be read from the unitary buffer 402, the read address unit 440 selects a read pointer for that memory client and delivers the read pointer to the unitary buffer 402 via an $A_{read}$ line 454. The data item is then read from the unitary buffer 402 at a memory location corresponding to the read pointer, and the unitary buffer 402 delivers the data item to that memory client via the $D_{read}$ bus 434. In the illustrated embodiment, the read address unit 440 delivers control information via one or more of a set of control lines 456, 458, 460, and 462 to indicate which memory client is the intended recipient of the data item. The read address unit 440 then updates the status information stored in the pair of search registers 442 and 444 to reflect the lack of assignment and occupancy of the memory location corresponding to the read pointer. The read address unit 440 also updates the read pointer for that memory client to the next occupied memory location for that memory client.

For example, when a data item requested by memory client 1 is to be read from the unitary buffer 402, the read address unit 440 selects the read pointer RP1 and delivers the read pointer RP1 to the unitary buffer 402. The data item is then read from the unitary buffer 402 at the memory location 404 corresponding to the read pointer RP1. Also, the read address unit 440 updates the status information stored in the pair of search registers 442 and 444 and updates the read pointer RP1.

Figure 6:
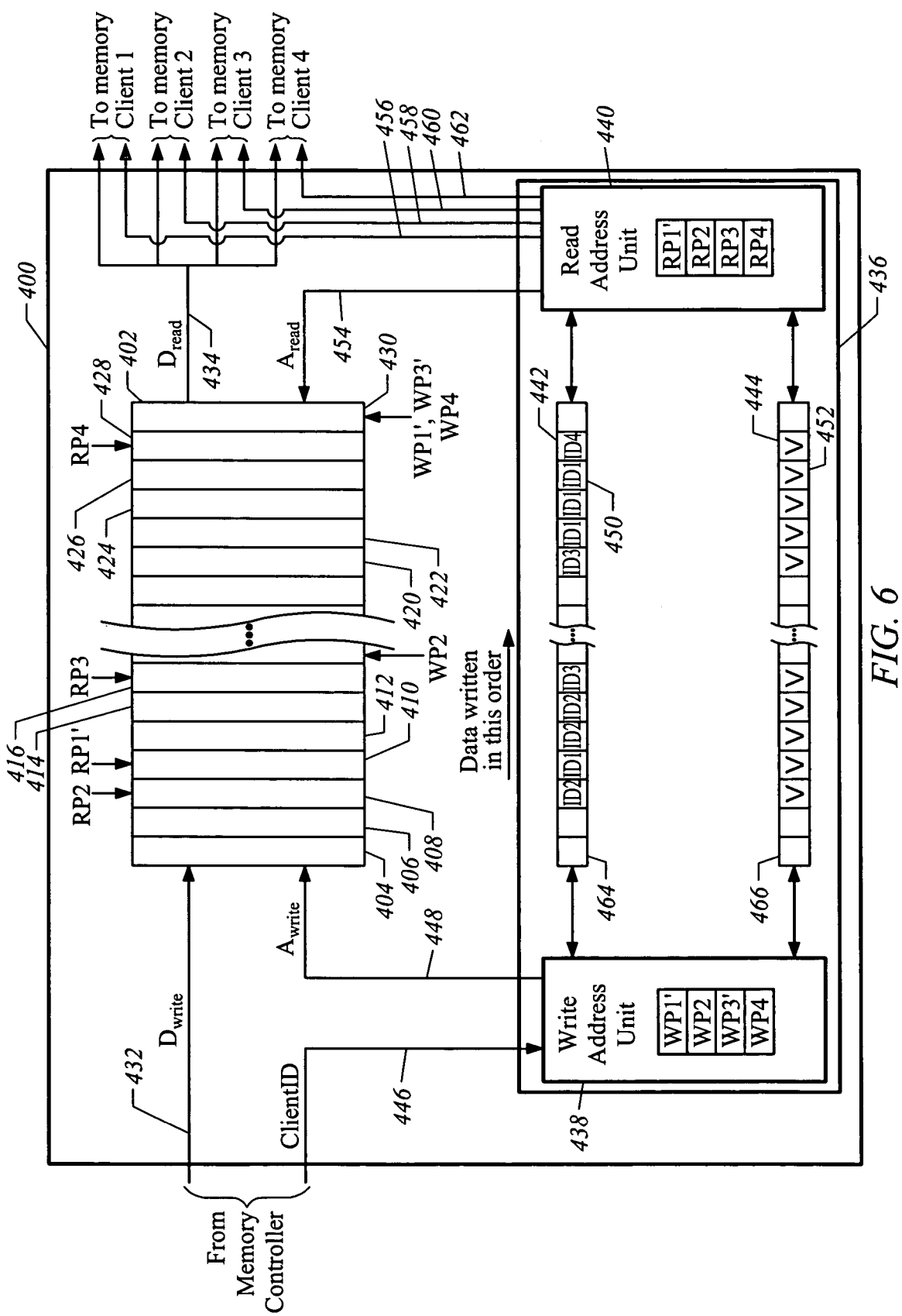
FIG. 6 illustrates the buffering module of FIG. 5 subsequent to a read operation.

FIG. 6 illustrates the buffering module 400 of FIG. 5 subsequent to reading the data item requested by memory client 1 from the unitary buffer 402. As illustrated in FIG. 6, the read address unit 440 updates the status information stored in the pair of search registers 442 and 444, such that a register slot 464 has a cleared Client ID, and a register slot 466 has a cleared valid tag. The read address unit 440 also updates the read pointer RP1 to the next occupied memory location for memory client 1 that is associated with a stored valid tag in the search register 444. In particular, the read pointer RP1 is updated to RP1', which indicates that the memory location 410 is now the current read memory location for memory client 1.

Figure 7:
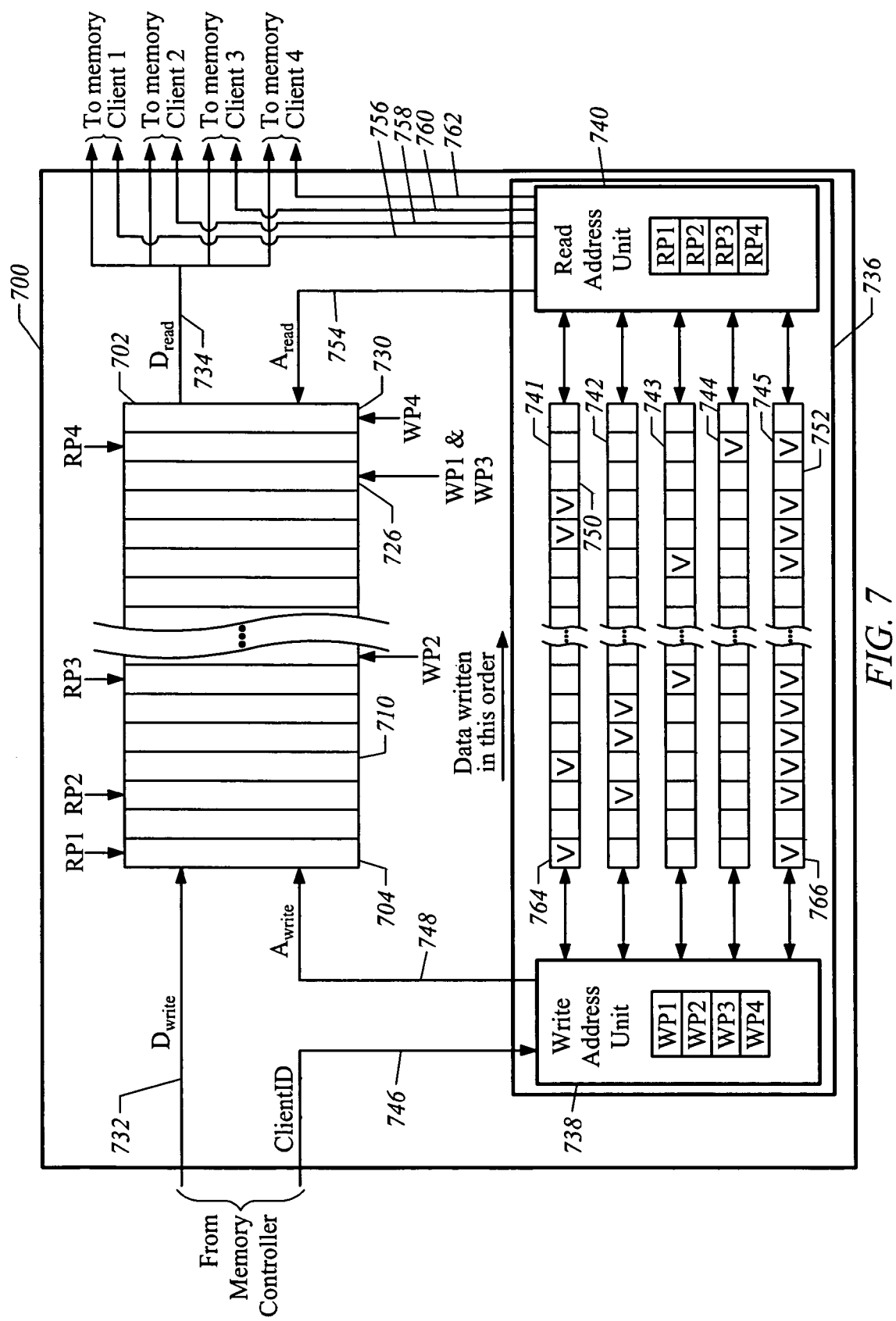
FIG. 7 illustrates a buffering module in accordance with another embodiment of the invention.
Figure 8:
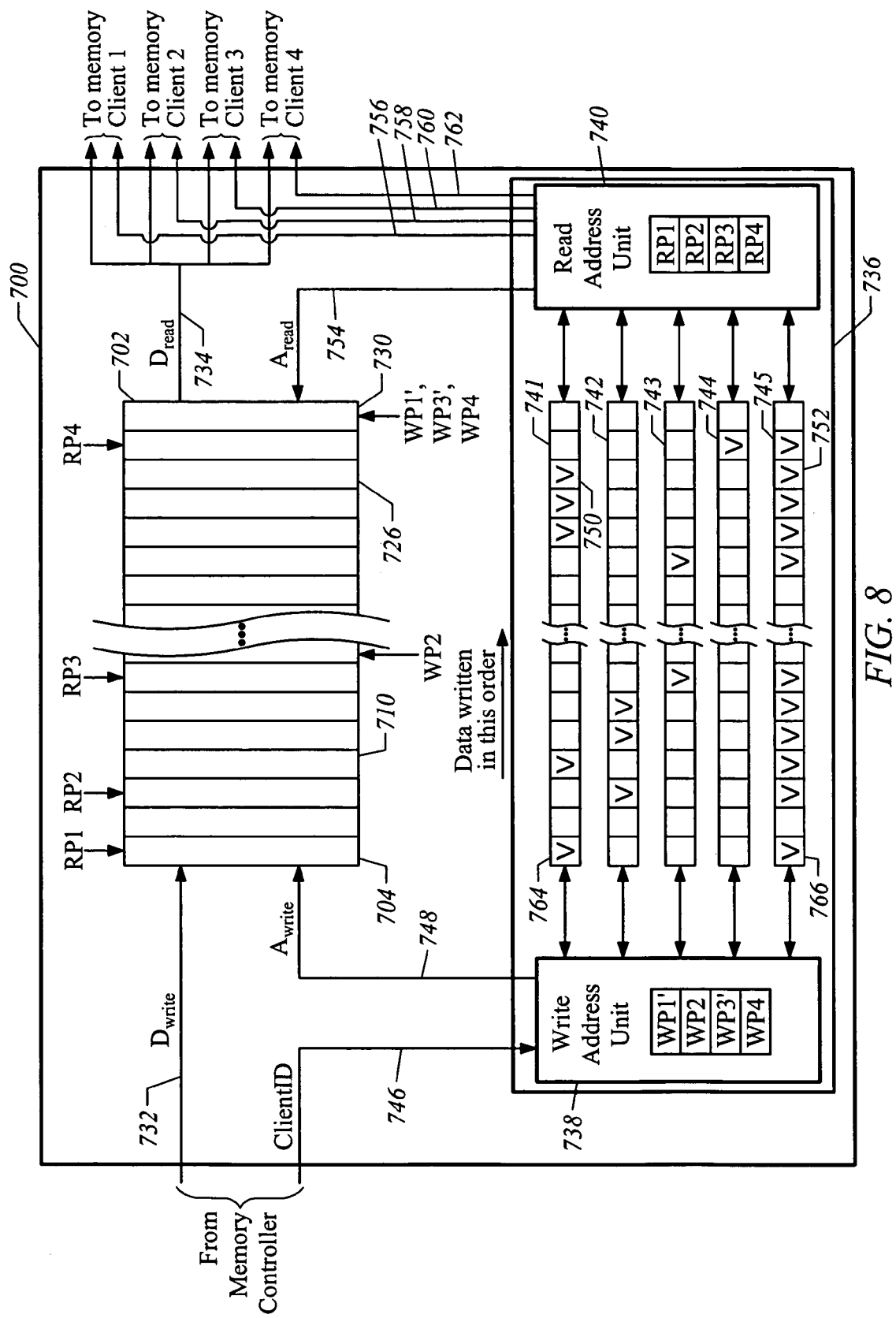
FIG. 8 illustrates the buffering module of FIG. 7 subsequent to a write operation.
Figure 9:
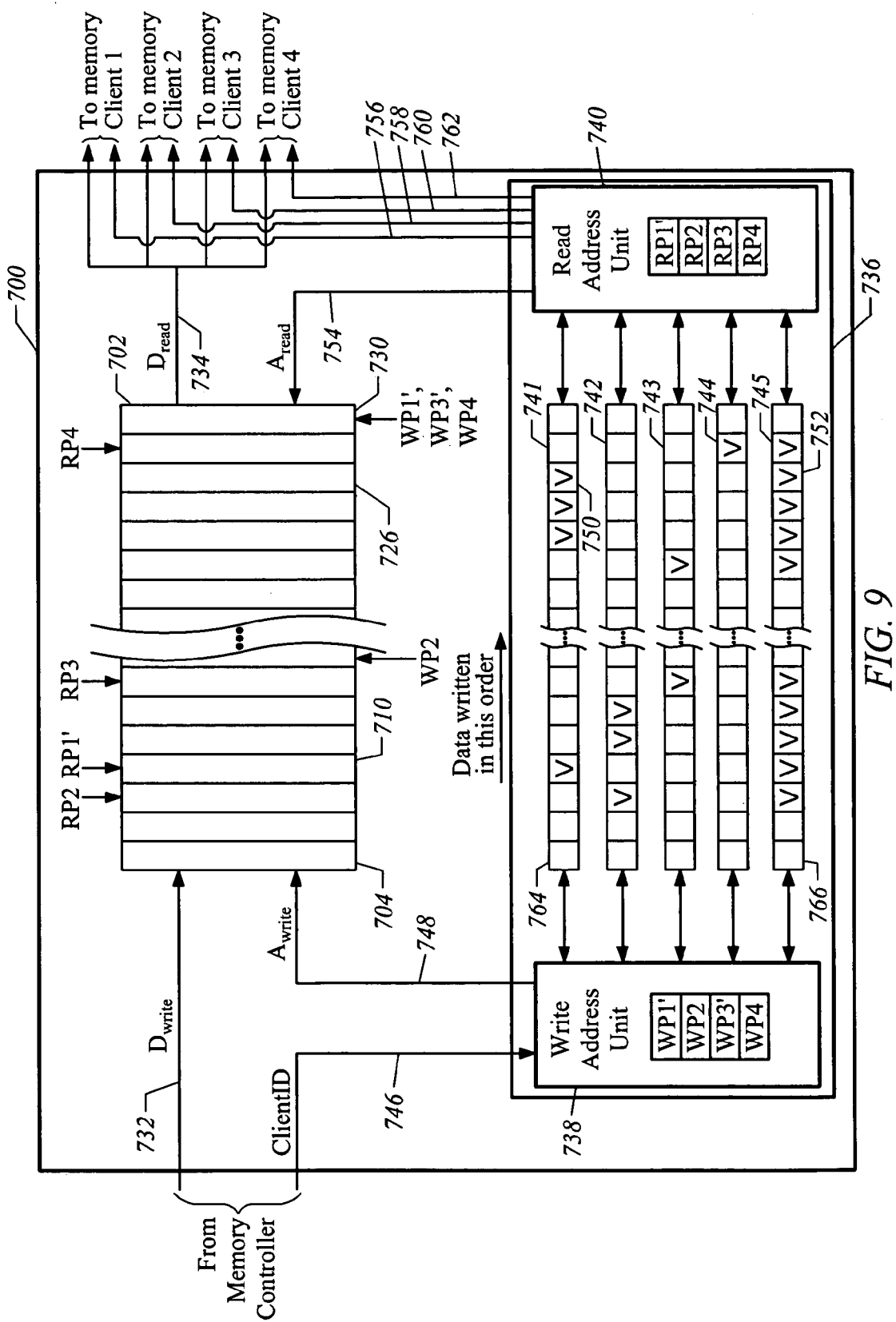
FIG. 9 illustrates the buffering module of FIG. 8 subsequent to a read operation.
Figure 1:
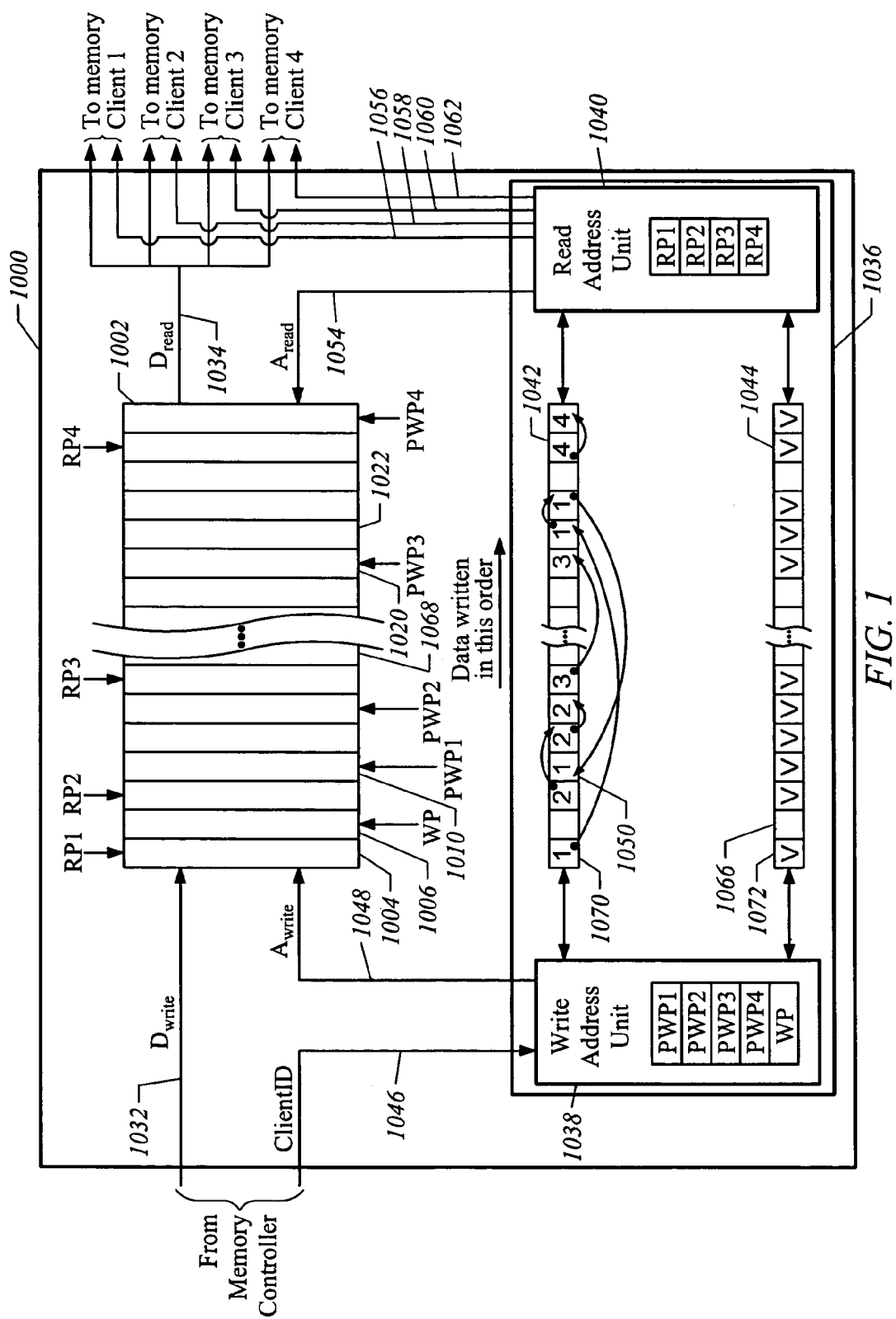

Turning next to FIG. 7, FIG. 8, and FIG. 9, a buffering module 700 in accordance with another embodiment of the invention is illustrated. As illustrated in FIG. 7, the buffering module 700 includes a unitary buffer 702 that is configured to store data items for a set of memory clients (i.e., memory client 1, memory client 2, memory client 3, and memory client 4). In the illustrated embodiment, the unitary buffer 702 is implemented and operates in a similar manner as the unitary buffer 402 previously discussed in connection with FIG. 4, FIG. 5, and FIG. 6. Thus, the unitary buffer 702 is implemented as a FIFO buffer using a RAM that includes n memory locations. As illustrated in FIG. 7, a memory controller delivers data items to the unitary buffer 702 via a $D_{write}$ bus 732, and the data items are written into the unitary buffer 702 along a particular direction (i.e., from left to right and subject to possible wrap around). Data items are read from the unitary buffer 702, and the unitary buffer 702 delivers the data items to the set of memory clients via a $D_{read}$ bus 734.

In the illustrated embodiment, the buffering module 700 also includes a buffer controller 736 that is connected to the unitary buffer 702. The buffer controller 736 is configured to coordinate the manner in which data items are written into and read from the unitary buffer 702. In the illustrated embodiment, the buffer controller 736 is configured to coordinate writing and reading of data items for each memory client in accordance with a FIFO scheme. As illustrated in FIG. 7, the buffer controller 736 includes a write address unit 738, a read address unit 740, and a set of search registers 741, 742, 743, 744, and 745 that are connected to the write address unit 738 and the read address unit 740.

The write address unit 738 maintains write pointers WP1, WP2, WP3, and WP4 for memory client 1, memory client 2, memory client 3, and memory client 4, respectively. The read address unit 740 maintains read pointers RP1, RP2, RP3, and RP4 for memory client 1, memory client 2, memory client 3, and memory client 4, respectively. By maintaining the write pointers WP1, WP2, WP3, and WP4 and the read pointers RP1, RP2, RP3, and RP4, data items can be stored in the unitary buffer 702 and delivered to each memory client in a correct order.

The write address unit 738 and the read address unit 740 operate in conjunction with the set of search registers 741, 742, 743, 744, and 745, which store status information for the n memory locations included in the unitary buffer 702. Each search register of the set of search registers 741, 742, 743, 744, and 745 includes n register slots, and each register slot is associated with a respective one of the n memory locations. The search registers 741, 742, 743, and 744 store valid tags to indicate current occupancies of the n memory locations with respect to memory client 1, memory client 2, memory client 3, and memory client 4, respectively. Thus, for example, the n register slots included in the search register 741 store valid tags to indicate current occupancies of the n memory locations with respect to memory client 1. The valid tags that are stored in the search registers 741, 742, 743, and 744 allow data items stored in the unitary buffer 702 to be associated with respective ones of the set of memory clients. The search register 745 stores valid tags to indicate current occupancies of the n memory locations with respect to all memory clients. As illustrated in FIG. 7, a valid tag is represented as "V".

For ease of presentation, the operation of the write address unit 738 is discussed below with reference to a specific example. As illustrated in FIG. 7, when a data item requested by memory client 1 is to be written into the unitary buffer 702, the memory controller delivers a Client ID for memory client 1 to the write address unit 738 via a Client ID line 746. Based on this Client ID, the write address unit 738 selects the write pointer WP1 and delivers the write pointer WP1 to the unitary buffer 702 via an $A_{write}$ line 748. The data item is then written into the unitary buffer 702 at a memory location 726 corresponding to the write pointer WP1. The write address unit 738 then updates the status information stored in the search registers 741 and 745 to reflect the current occupancy of the memory location 726. The write address unit 738 also updates the write pointer WP1 to the next available memory location for memory client 1.

FIG. 8 illustrates the buffering module 700 of FIG. 7 subsequent to writing the data item requested by memory client 1 into the unitary buffer 702. As illustrated in FIG. 8, the write address unit 738 updates the status information stored in the search registers 741 and 745, such that a register slot 750 and a register slot 752 store valid tags. The write address unit 738 also updates the write pointer WP1 to the next memory location for memory client 1 that is associated with a cleared valid tag in the search register 745. In particular, the write pointer WP1 is updated to WP1', which indicates that a memory location 730 is now the current write memory location for memory client 1. In the illustrated embodiment, the write address unit 738 also updates the write pointer WP3 to the next available memory location for memory client 3. In particular, the write pointer WP3 is updated to WP3', which indicates that the memory location 730 is also the current write memory location for memory client 3.

For ease of presentation, the operation of the read address unit 740 is also discussed below with reference to a specific example. As illustrated in FIG. 8, when a data item requested by memory client 1 is to be read from the unitary buffer 702, the read address unit 740 selects the read pointer RP1 and delivers the read pointer RP1 to the unitary buffer 702 via an $A_{read}$ line 754. The data item is then read from the unitary buffer 702 at a memory location 704 corresponding to the read pointer RP1, and the unitary buffer 702 delivers the data item to memory client 1 via the $D_{read}$ bus 734. In the illustrated embodiment, the read address unit 740 delivers control information via one or more of a set of control lines 756, 758, 760, and 762 to indicate that memory client 1 is the intended recipient of the data item. The read address unit 740 then updates the status information stored in the search registers 741 and 745 to reflect the lack of occupancy of the memory location 704. The read address unit 740 also updates the read pointer RP1 to the next occupied memory location for memory client 1.

FIG. 9 illustrates the buffering module 700 of FIG. 8 subsequent to reading the data item requested by memory client 1 from the unitary buffer 702. As illustrated in FIG. 9, the read address unit 740 updates the status information stored in the search registers 741 and 745, such that a register slot 764 and a register slot 766 have their valid tags cleared. The read address unit 740 also updates the read pointer RP1 to the next occupied memory location for memory client 1 that is associated with a stored valid tag in the search register 745. In particular, the read pointer RP1 is updated to RP1', which indicates that a memory location 710 is now the current read memory location for memory client 1.

Figure 11:
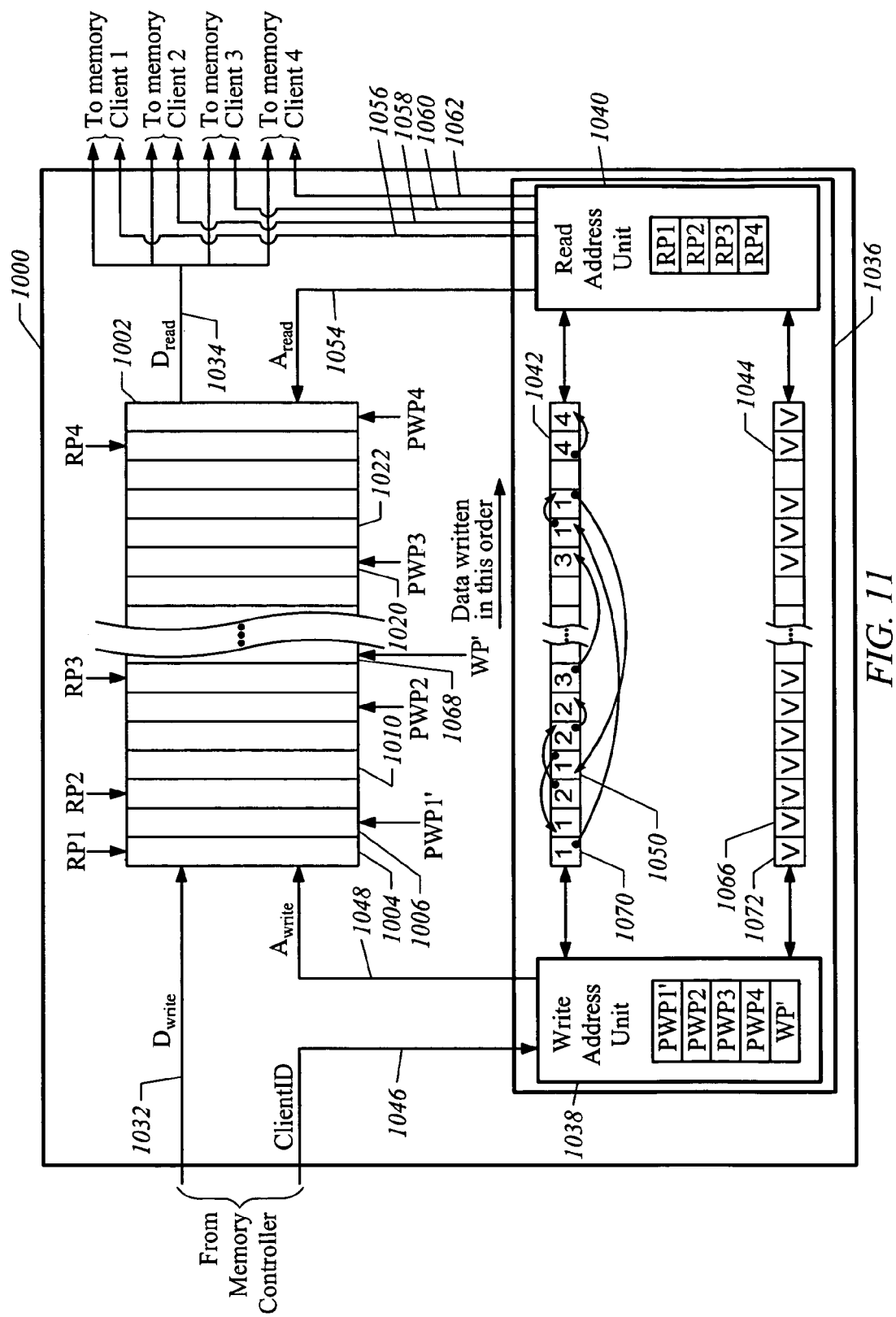
FIG. 11 illustrates the buffering module of FIG. 10 subsequent to a write operation.
Figure 12:
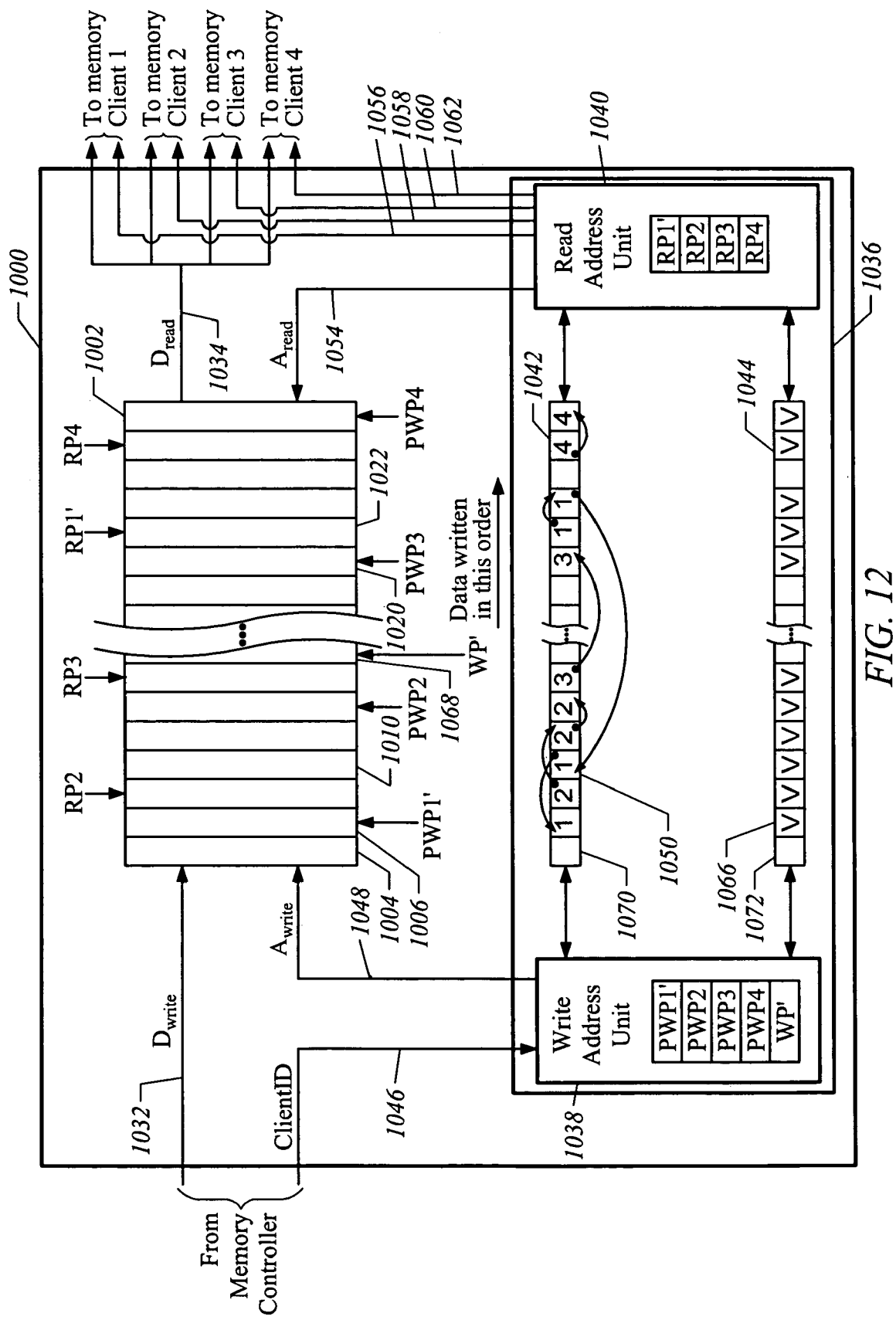
FIG. 12 illustrates the buffering module of FIG. 11 subsequent to a read operation.

Attention next turns to FIG. 10, FIG. 11, and FIG. 12, which illustrate a buffering module 1000 in accordance with a further embodiment of the invention. As illustrated in FIG. 10, the buffering module 1000 includes a unitary buffer 1002 that is configured to store data items for a set of memory clients (i.e., memory client 1, memory client 2, memory client 3, and memory client 4). In the illustrated embodiment, the unitary buffer 1002 is implemented and operates in a similar manner as the unitary buffer 402 previously discussed in connection with FIG. 4, FIG. 5, and FIG. 6. Thus, the unitary buffer 1002 is implemented as a FIFO buffer using a RAM that includes n memory locations. As illustrated in FIG. 10, a memory controller delivers data items to the unitary buffer 1002 via a $D_{write}$ bus 1032, and the data items are written into the unitary buffer 1002 along a particular direction (i.e., from left to right and subject to possible wrap around). Data items are read from the unitary buffer 1002, and the unitary buffer 1002 delivers the data items to the set of memory clients via a $D_{read}$ bus 1034.

In the illustrated embodiment, the buffering module 1000 also includes a buffer controller 1036 that is connected to the unitary buffer 1002. The buffer controller 1036 is configured to coordinate the manner in which data items are written into and read from the unitary buffer 1002. In the illustrated embodiment, the buffer controller 1036 is configured to coordinate writing and reading of data items for each memory client in accordance with a FIFO scheme. As illustrated in FIG. 10, the buffer controller 1036 includes a write address unit 1038, a read address unit 1040, and a pair of search registers 1042 and 1044 that are connected to the write address unit 1038 and the read address unit 1040.

The write address unit 1038 maintains a write pointer WP, which indicates the current write memory location for all memory clients. For example, the write pointer WP indicates that a memory location 1006 is the current write memory location for all memory clients. The write address unit 1038 also maintains previous write pointers PWP1, PWP2, PWP3, and PWP4 for memory client 1, memory client 2, memory client 3, and memory client 4, respectively. Each previous write pointer indicates the previous write memory location for a particular memory client. For example, the previous write pointer PWP1 indicates that a memory location 1010 is the previous write memory location for memory client 1. As another example, previous write pointer PWP3 indicates that a memory location 1020 is the previous write memory location for memory client 3. The read address unit 1040 maintains read pointers RP1, RP2, RP3, and RP4 for memory client 1, memory client 2, memory client 3, and memory client 4, respectively. By maintaining the write pointer WP, the previous write pointers PWP1, PWP2, PWP3, and PWP4, and the read pointers RP1, RP2, RP3, and RP4, data items can be stored in the unitary buffer 1002 and delivered to each memory client in a correct order.

The write address unit 1038 and the read address unit 1040 operate in conjunction with the pair of search registers 1042 and 1044, which store status information for the n memory locations included in the unitary buffer 1002. The search register 1042 includes n register slots that are each associated with a respective one of the n memory locations. Similarly, the search register 1044 includes n register slots that are each associated with a respective one of the n memory locations. The search register 1042 stores a link list to indicate links between memory locations included in the n memory locations. Each link corresponds to an association between two memory locations that currently store data items to be delivered to a particular memory client, such that a data item stored in one memory location is the next one to be delivered to that memory client after a data item stored in the other memory location is delivered to that memory client. The link list that is stored in the search register 1042 allows data items stored in the unitary buffer 1002 to be associated with respective ones of the set of memory clients. Also, as further discussed below with respect to the operation of the read address unit 1040, the link list allows the read pointers RP1, RP2, RP3, and RP4 to be readily updated. In addition, the link list allows data items to be delivered in a correct order even if the data items are stored in an out-of-order manner. As illustrated in FIG. 10, links are represented by arrows between different register slots included in the search register 1042. The search register 1044 stores valid tags to indicate current occupancies of the n memory locations. As illustrated in FIG. 10, a valid tag is represented as "V".

For ease of presentation, the operation of the write address unit 1038 is discussed below with reference to a specific example. As illustrated in FIG. 10, when a data item requested by memory client 1 is to be written into the unitary buffer 1002, the write address unit 1038 delivers the write pointer WP to the unitary buffer 1002 via an $A_{write}$ line 1048. The data item is then written into the unitary buffer 1002 at the memory location 1006 corresponding to the write pointer WP. In conjunction with delivering the data item, the memory controller delivers a Client ID for memory client 1 to the write address unit 1038 via a Client ID line 1046. Based on this Client ID, the write address unit 1038 selects the previous write pointer PWP1 and identifies a current link between the memory location 1010 corresponding to the previous write pointer PWP1 and the memory location 1006 corresponding to the write pointer WP. The write address unit 1038 then updates the status information stored in the pair of search registers 1042 and 1044 to reflect the current link between the memory locations 1006 and 1010 and the current occupancy of the memory location 1006. Also, the write address unit 1038 updates the previous write pointer PWP1 to correspond to the write pointer WP and updates the write pointer WP to the next available memory location.

FIG. 11 illustrates the buffering module 1000 of FIG. 10 subsequent to writing the data item requested by memory client 1 into the unitary buffer 1002. As illustrated in FIG. 11, the write address unit 1038 updates the status information stored in the search register 1042, such that a register slot 1050 associated with the memory location 1010 stores the write pointer WP, thus reflecting the current link between the memory locations 1006 and 1010. Also, the write address unit 1038 updates the status information stored in the search register 1044, such that a register slot 1066 stores a valid tag. The write address unit 1038 then updates the previous write pointer PWP1 to PWP1', which corresponds to the write pointer WP. The write address unit 1038 also updates the write pointer WP the next memory location that is associated with a cleared valid tag in the search register 1044. In particular, the write pointer WP is updated to WP', which indicates that a memory location 1068 is now the current write memory location for all memory clients.

For ease of presentation, the operation of the read address unit 1040 is also discussed below with reference to a specific example. As illustrated in FIG. 11, when a data item requested by memory client 1 is to be read from the unitary buffer 1002, the read address unit 1040 selects the read pointer RP1 and delivers the read pointer RP1 to the unitary buffer 1002 via an $A_{read}$ line 1054. The data item is then read from the unitary buffer 1002 at a memory location 1004 corresponding to the read pointer RP1, and the unitary buffer 1002 delivers the data item to memory client 1 via the $D_{read}$ bus 1034. In the illustrated embodiment, the read address unit 1040 delivers control information via one or more of a set of control lines 1056, 1058, 1060, and 1062 to indicate that memory client 1 is the intended recipient of the data item. The read address unit 1040 then updates the read pointer RP1 to the next occupied memory location for memory client 1. The read address unit 1040 also updates the status information stored in the pair of search registers 1042 and 1044 to reflect the lack of a link between the memory location 1004 and a memory location 1022 and the lack of occupancy of the memory location 1004.

FIG. 12 illustrates the buffering module 1000 of FIG. 11 subsequent to reading the data item requested by memory client 1 from the unitary buffer 1002. As illustrated in FIG. 12, the read address unit 1040 updates the read pointer RP1 to the next occupied memory location for memory client 1. Advantageously, the read pointer RP1 is readily updated based on the content of a register slot 1070 included in the search register 1042, which content reflects a previous link between the memory locations 1004 and 1022. In particular, the read pointer RP1 is updated to RP1', which indicates that the memory location 1022 is now the current read memory location for memory client 1. The read address unit 1040 then updates the status information stored in the pair of search registers 1042 and 1044, such that the register slot 1070 has its link cleared, and a register slot 1072 has its valid tag cleared.

It should be recognized that the specific embodiments of the invention discussed above are provided by way of example, and various other embodiments are encompassed by the invention. For example, with reference to FIG. 2, it is contemplated that the buffering module 226 can include an array of buffers, such that each buffer has a buffering space that is shared by two or more of the set of memory clients 216, 218, 220, and 222.

With reference to FIG. 2, it is contemplated that the size of the shared buffering space can be selected based on memory access requirements of the set of memory clients 216, 218, 220, and 222. For example, the size of the shared buffering space can be selected to meet typical memory access requirements of the set of memory clients 216, 218, 220, and 222. In particular, certain memory clients, such as those associated with a cursor and an overlay, typically have smaller memory access requirements than other memory clients, such those associated with a base. As another example, the size of the shared buffering space can be selected to meet worst-case memory access requirements of the set of memory clients 216, 218, 220, and 222. It is contemplated that typical and worse-case memory access requirements of the set of memory clients 216, 218, 220, and 222 can be determined based on simulations of operation under typical and worse-case conditions.

While some embodiments of the invention have been described with reference to delivering data to a set of memory clients in accordance with a FIFO scheme, it is contemplated that other embodiments of the invention can relate to delivering data to a set of memory clients in accordance with another scheme, such as, for example, a Last-In First-Out scheme.

Also, while some embodiments of the invention have been described with reference to delivering data to a set of memory clients via a unitary buffer, it is contemplated that other embodiments of the invention can relate to retrieving data from a set of memory clients via a unitary buffer.

With reference to FIG. 4 through FIG. 12, it is contemplated that a unitary buffer (e.g., the unitary buffer 402) and one or more search registers (e.g., the pair of search registers 442 and 444) can be implemented as a unitary component. For example, the unitary buffer 402 can be implemented using a RAM that includes n memory locations, such that a particular memory location included in the n memory locations is configured to store a data item as well as status information for that memory location.

Some embodiments of the invention relate to a computer storage product with a computer-readable medium having computer code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic storage media such as hard disks, floppy disks, and magnetic tape; optical storage media such as CD/DVDs, CD-ROMs, and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, machine code, such as produced by a compiler, and files containing higher-level code that are executed by a computer using an interpreter. For example, an embodiment of the invention may be implemented using Java, C++, or other object-oriented programming language and development tools. Additional examples of computer code include, but are not limited to, encrypted code and compressed code.

Some embodiments of the invention can be implemented using computer code in place of, or in combination with, hardwired circuitry. With reference to FIG. 2, various components of the computer system 200 can be implemented using computer code, hardwired circuitry, or a combination thereof. For example, the buffer controller 230 can be implemented using computer code in place of, or in combination with, hardwired circuitry.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process operation or operations, to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A method of delivering data to a plurality of memory clients via a unitary buffer, comprising:

assigning a first portion of said unitary buffer to store data requested by a first memory client of said plurality of memory clients;

assigning a second portion of said unitary buffer to store data requested by a second memory client of said plurality of memory clients;

delivering said data requested by said first memory client from said first portion of said unitary buffer to said first memory client in accordance with a First-In First-Out scheme;

delivering said data requested by said second memory client from said second portion of said unitary buffer to said second memory client in accordance with a First-In First-Out scheme;

subsequent to delivering said data requested by said first memory client, assigning said first portion of said unitary buffer to store additional data requested by said second memory client; and delivering said additional data requested by said second memory client from said first portion of said unitary buffer to said second memory client.

2. A method of delivering data to a plurality of memory clients via a unitary buffer, comprising:

assigning a first portion of said unitary buffer to store data requested by a first memory client of said plurality of memory clients;

assigning a second portion of said unitary buffer to store data requested by a second memory client of said plurality of memory clients;

delivering said data requested by said first memory client from said first portion of said unitary buffer to said first memory client in accordance with a First-In First-Out scheme;

delivering said data requested by said second memory client from said second portion of said unitary buffer to said second memory client in accordance with a First-In First-Out scheme;

subsequent to delivering said data requested by said first memory client, assigning said first portion of said unitary buffer to store data requested by a third memory client of said plurality of memory clients; and delivering said data requested by said third memory client from said first portion of said unitary buffer to said third memory client.

* * * * *